United States Patent [19]

Habelt

[11] Patent Number: 5,316,144
[45] Date of Patent: * May 31, 1994

[54] HOLDER FOR A CASSETTE

[75] Inventor: Gerhard Habelt, Vienna, Austria

[73] Assignee: U.S. Philips Corporation, New York, N.Y.

[*] Notice: The portion of the term of this patent subsequent to Aug. 4, 2009 has been disclaimed.

[21] Appl. No.: 853,677

[22] Filed: Mar. 19, 1992

Related U.S. Application Data

[63] Continuation-in-part of Ser. No. 784,352, Oct. 29, 1991, abandoned.

[30] Foreign Application Priority Data

Mar. 26, 1991 [AT] Austria .................. A 666/91

[51] Int. Cl.5 .......................................... B65D 85/575
[52] U.S. Cl. ..................... 206/387; 206/1.5; 206/493
[58] Field of Search .................. 206/1.5, 45.14, 45.15, 206/312, 387, 444, 493

[56] References Cited

U.S. PATENT DOCUMENTS

| | | | |
|---|---|---|---|
| 3,994,551 | 11/1976 | Ackeret | 206/387 |
| 4,022,322 | 5/1977 | Louzil | 206/387 |
| 4,055,372 | 10/1977 | Tozawa et al. | |
| 4,365,713 | 12/1982 | Ekuan | 206/387 |
| 4,592,600 | 6/1986 | Bohnet et al. | |
| 4,819,797 | 4/1989 | Holmgren | 206/309 |
| 5,039,982 | 8/1991 | Bruhwiler | 206/1.5 |
| 5,135,111 | 8/1992 | Stoger | 206/387 |

FOREIGN PATENT DOCUMENTS 90266  5/1984  Japan ..................... 206/387

Primary Examiner—David T. Fidei
Attorney, Agent, or Firm—Brian J. Wieghaus

[57] ABSTRACT

A rectangular holder (1), which has two main walls (2, 3) and three side walls (4, 5, 6) and is open at a fourth side (7), comprises a clamping member (11) of an abrasion-proof elastic plastics, for clamping a cassette in the holder (1), which clamping member comprises an elastically deformable plate portion (12) which carries a clamping projection (13) and is retained by a retaining portion (15) connected to the holder (1).

17 Claims, 2 Drawing Sheets

HOLDER FOR A CASSETTE

This application is a continuation in part of Ser. No. 07/784,352 filed Oct. 29, 1991 now abandoned.

BACKGROUND OF THE INVENTION

The invention relates to a holder of rectangular shape which comprises two main walls and three side walls interconnecting the two main walls, and is open at a fourth side, which holder is adapted to receive through the open side a rectangular cassette with a record carrier contained therein in order to protect the cassette and, at the location of at least one side wall comprises a clamping member for clamping a cassette inserted in the holder, which clamping member is connected to the holder at the location of said side wall, comprises a part which projects into the holder interior and is made of an elastic material and, via the part which projects into the holder interior, can be partly deformed elastically by a cassette inserted in the holder.

For such a holder, been proposed to construct the clamping member as a plug-type member of an elastomeric material and to snap the clamping member with an annular groove formed in this member into a hole in the relevant side wall of the holder. In practice, such a clamping member can be manufactured by means of a moulding process. When a cassette is inserted into the holder and cooperates with the clamping member comparatively large elastic deformation occur which deformations when the clamping member extends through the relevant side wall cause the clamping member to protrude outwardly, i.e. to form a bulge, which is undesirable not only for cosmetic reasons. The bulging sides will prevent a close and space-saving stacking of the packages. This may be particularly harmful in automatic cassette changers. Moreover, with such a plug-type clamping member the likelihood of the member being inadvertently pressed out of the hole in the side wall is comparatively high.

SUMMARY OF THE INVENTION

It is an object of the invention to mitigate the above problems with a holder of the type defined in the opening paragraph and to provide a holder whose clamping member can be manufactured simply, which has a stable and lasting connection between the clamping member and the holder, and which does not give rise to any substantial elastic deformations.

According to the invention this object is achieved in that the clamping member is made of an abrasion-proof elastic plastics and the clamping member comprises a flat elastically deformable plate portion whose thickness is smaller than that of the side wall at whose location the clamping member is connected to the holder, a clamping projection projecting from said plate portion into the holder interior to retain a cassette inserted into the holder and the plate portion being retained by a retaining portion connected to the holder. Such a clamping member of an elastic plastics can be manufactured by a simple injection-moulding process requiring a comparatively short cycle time, which is advantageous for mass production. Such a clamping member is not as soft as a silicone rubber clamping member, so that deformations can be kept within limits and the appearance is not disturbed by conspicuous deformations. Moreover, such a plastics clamping member has the advantage of a high resistance to abrasion and a long life and can be manufactured accurately and with small tolerances. In addition, such a clamping member of an elastic plastics can be connected to the holder in a very stable and reliable manner, so that the risk of the clamping member being lost is avoided. The proposed construction of the clamping member is found to be advantageous for minimal visible deformations and a reliable connection to the holder.

It is to be noted that a holder for receiving a cassette is known from DE 26 13 389 A1, which holder comprises a housing having two main walls and three side walls and a holder means which is pivotably mounted in the housing and serves to hold a cassette. The holder means comprises resilient latching elements of an elastic plastics, which elements are adapted to cooperate with the reel hubs of the cassette to lock the reel hubs against rotation. These latching elements are not connected to the holder in the direct proximity of a side wall of the holder but to the holder means situated inside the holder, to that deformations of the latching elements cannot affect the appearance of the holder. Moreover, the latching elements do not serve for clamping a cassette in the holder but for blocking the reel hubs of the cassette. In addition, the latching elements do not comprise an elastically deformable plate portion from which a clamping projection projects into the holder interior to clamp a cassette inserted into the holder and which is retained in the holder by a retaining portion connected to the holder, as is the case with the clamping member of the holder in accordance with the invention, yielding the above-mentioned advantageous features of the invention.

Moreover, it is to be noted that from Austrian Patent Specification 340,165 a holder for a magnetic-tape cassette is known, which comprises a readily deformable ribbon-shaped ejection element which may be made of an elastic plastics and which also serves as a positively acting retaining element. However, this element is neither connected to the holder in the direct proximity of a side wall thereof but is fitted comparatively loosely in the holder. The ejection element neither comprises an elastically deformable plate portion from which a clamping projection projects into the holder interior to clamp a cassette inserted into the holder and which is retained in the holder by a retaining portion connected to the holder, as is the case with the clamping member of the holder in accordance with the invention, yielding the above-mentioned advantageous features of the invention.

With respect to the construction of the retaining portion of such a clamping member it is found to be advantageous if the retaining portion of the clamping member is formed by a frame surrounding the elastically deformable plate portion of the clamping member. This is advantageous because with such a construction the elastically deformable plate portion is retained all around.

With respect to the connection of such a clamping member to the holder it is found to be advantageous if a groove-spring means is interposed between the holder and each of at least two mutually parallel frame limbs and, to mount the clamping member on the holder, the clamping member is slidable onto the holder in a slide-on direction which extends parallel to the orientation of the two mutually parallel groove-spring means. This results in simple mounting and a comparatively accurate positioning of the clamping member on the holder.

It is also found to be advantageous for the connection of such a clamping member to the holder if the clamping member comprises a latching nose which projects into the holder interior from the frame and which when the clamping member is slid onto the holder engages behind a holder portion to block a movement of the clamping member in a direction opposite to the slide-on direction. In this way the clamping member is secured to the holder in a very simple manner and is yet easy to detach from the holder be releasing the snapped connection, for example in order to replace the clamping member when it is damaged or no longer functions correctly.

With respect to the plastics for the clamping member it is found to be advantageous if the plastics of which the clamping member is made is a block copolymer which can be processed as a thermoplastic and which comprises a hard segment of polybutylene teraphtalate and a soft segment on the basis of long-chain polyether glycols. This synthetic material combines a number of properties which are advantageous in the present context, such as a high tenacity and resilience, a high creep resistance, impact strength, bending endurance, flexibility at low temperatures and conservation of the advantageous properties at high temperatures. Such a plastics is commercially available from Messrs. Du Pont under the trade name "Hytrel".

BRIEF DESCRIPTION OF THE DRAWINGS

An embodiment of the invention will now be described in more detail by way of non-limitative example.

DESCRIPTION OF THE PREFERRED EMBODIMENTS

Figure 1:
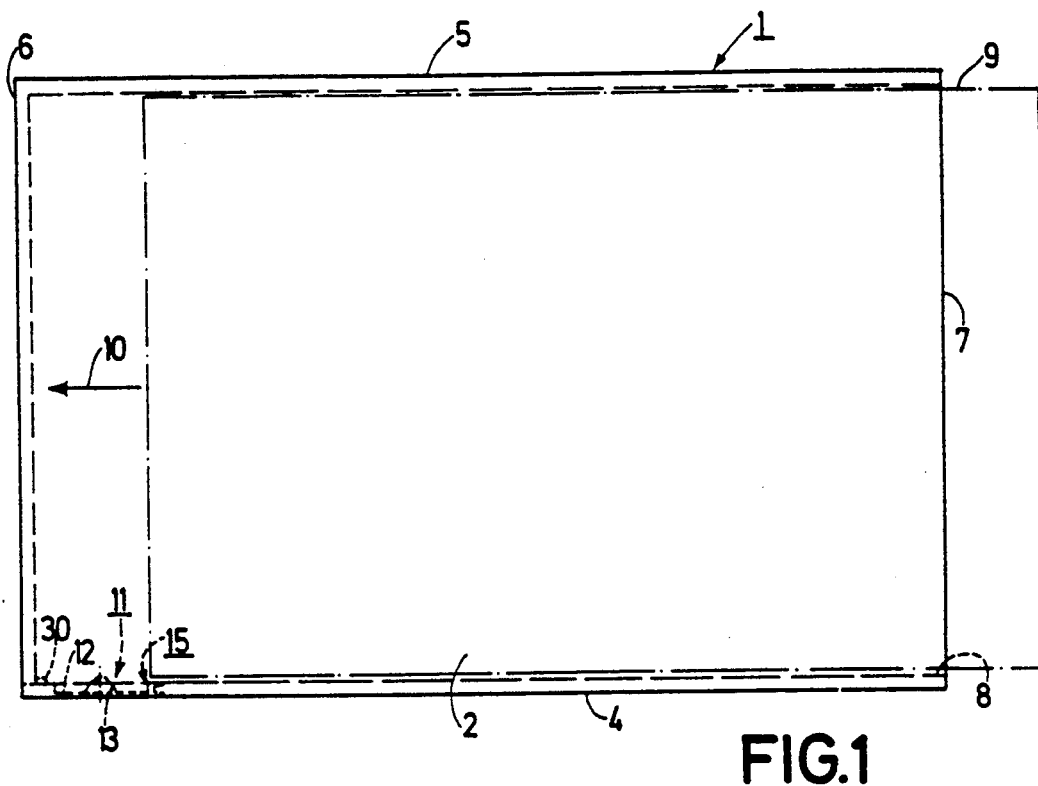
FIG. 1 is an enlarged-scale slightly diagrammatical plan view of a holder in accordance with an embodiment of the invention which is adapted to receive a cassette containing a magnetic tape and which comprises a clamping member which can be mounted in that it is slid into the holder.
Figure 2:
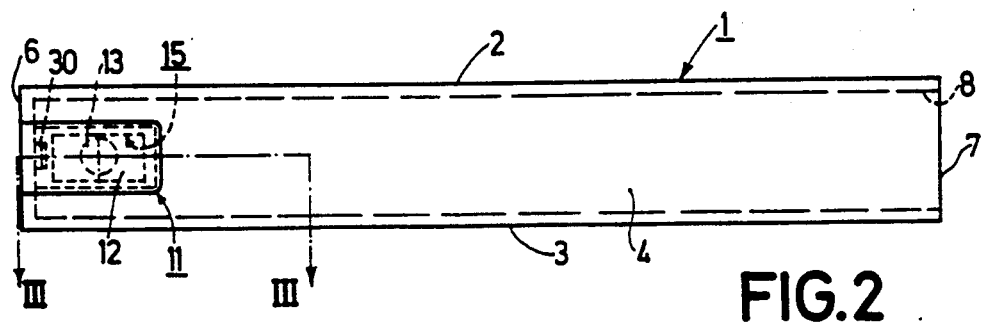
FIG. 2 is a side view at the side wall of the holder shown in FIG. 1, which side wall carries the clamping member.

FIGS. 1 and 2 show a rectangular holder 1 in accordance with an embodiment of the invention. The holder 1 is made of a dimensionally stable plastics, for example polycarbonate or acrylonitrile-butadiene styrene. These plastics both have a satisfactory shape retention and a high temperature resistance, which is important for a holder of this kind because such a holder is often exposed to large temperature fluctuations. The holder 1 has two main walls, i.e. a top wall 2 and a bottom wall 3. The holder 1 further comprises three side walls interconnecting the two main walls 2 and 3, i.e. a left-hand side wall 4, a right-hand side wall 5 and a rear side wall 6. The fourth side 7 of the holder 1 is open, the holder having an opening 8 in this side 7. Through the opening 8 in the open side 7 a rectangular cassette 9, shown diagrammatically in dash-dot lines in FIG. 1 and containing a record carrier, in the present case a magnetic tape not shown, can be inserted into the holder 1 in order to protect the cassette 9. It is to be noted that the holder 1 has a partition, not shown, which separates the cassette-receiving space from a further receiving space adapted to receive a label, which partition is not shown in FIGS. 1 and 2 because it is not relevant in the present context.

At the location of the left-hand side wall 4 the holder 1 comprises a clamping member 11, which is connected to the holder 1 at the location of this side wall 4 for clamping a cassette 9 inserted into the holder 1 in the direction indicated by the arrow 10. Suitably, the clamping member 11 is made of an abrasion-proof elastic plastics. Such a clamping member has the advantage that it can be manufactured in a simple injection-moulding process in very short cycle time, which is beneficial for mass production. By means of such an injection-moulding process the clamping member can be manufactured with a high dimensional accuracy and small tolerances, which is particularly important in the case of a part of such a small size. Since the clamping member is made of an abrasion-proof elastic plastics this also guarantees a long life and a constant satisfactory performance throughout this long life. Such a clamping member of an elastic plastics further has the advantage that its elasticity can be chosen smaller than that of a silicone rubber clamping member, which yields the advantage that the deformations at the location of the cylindrical portion of such an elastic plastics clamping member are smaller so that the appearance is not disturbed by conspicuous deformations. The abrasion-proof elastic plastics of which the clamping member is made can be, for example, a block copolymer which can be processed as a thermoplastic and which comprises a hard segment of polybutylene teraphtalate and a soft segment on the basis of long-chain polyether glycols. Such a plastics is commercially available from Messrs. Du Pont under the trade name "Hytrel".

Figure 3:
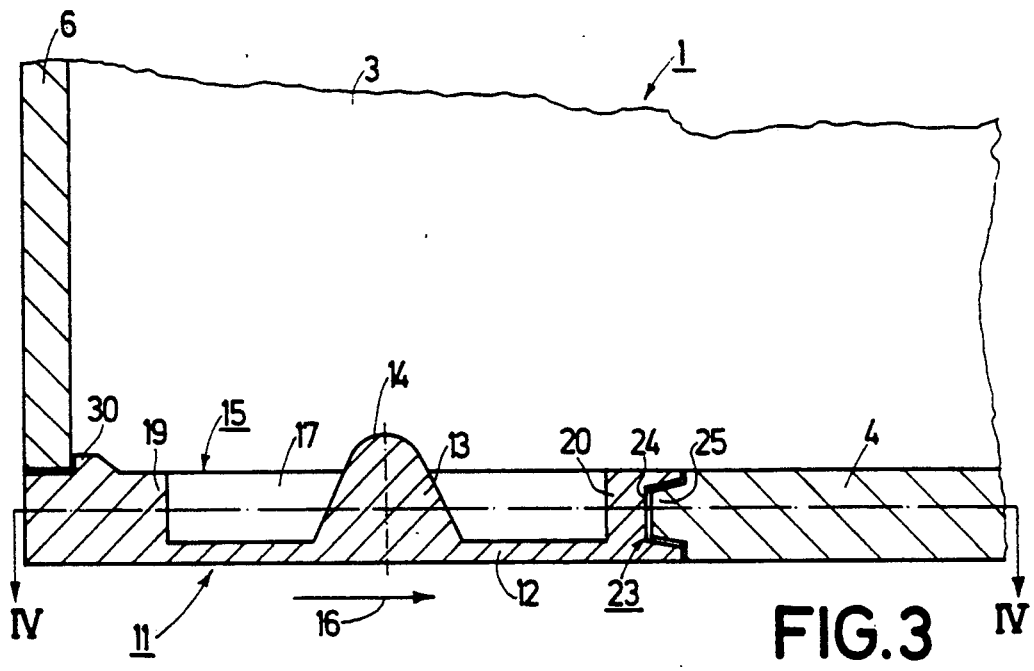
FIG. 3 shows a part of the holder shown in FIG. 2, including the clamping member, in a sectional view taken on the line III—III in FIG. 2 and to a larger scale than in FIG. 2.
Figure 4:
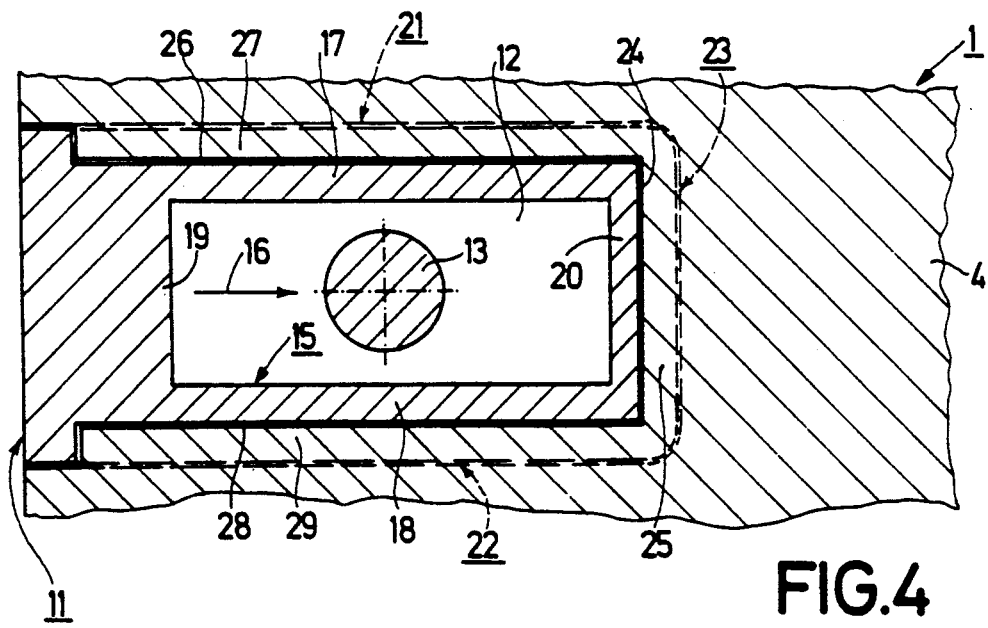
FIG. 4 shows the same part of the holder of FIGS. 1 and 2 as shown in FIG. 3 in the sectional view taken on the line IV—IV in FIG. 3.

FIGS. 3 and 4 only show a part of the holder 1 shown in FIGS. 1 and 2 and clearly show the clamping member 11 of this holder 1. As already stated, the clamping member 11 comprises a flat elastically deformable plate portion 12 whose thickness is smaller than that of the side wall 4 at whose location the clamping member 11 is connected to the holder 1. A clamping projection 13 projects from the plate portion 12 into the holder interior to retain a cassette inserted into the holder 1 and not shown in FIGS. 3 and 4. The free dome-shaped end 14 of the clamping projection 13 extends into the insertion path of a cassette. The plate portion 12 is retained by a retaining portion 15 connected to the holder 1. The retaining portion 15 of the clamping member 11 is formed by a frame surrounding the elastically deformable plate portion 12 of the clamping member 11. The frame 15 comprises two frame limbs 17 and 18 which extend parallel to each other and to a direction indicated by an arrow 16 and two frame limbs 19 and 20 which also extend parallel to each other and transversely of the direction indicated by the arrow 16.

Elastic tongue and groove combinations 21, 22, 23 is interposed between the holder 1, i.e. the side wall 4 of the holder 1, and the two mutually parallel frame limbs 17, 18 and the further frame limb 20 respectively, which last-mentioned limb extends transversely of these two limbs 17 and 18. Of the spring-groove means 23 the sectional view in FIG. 3 shows the groove 24 in the clamping member 11 or the further limb 20 thereof and the spring 25 in the holder 1 or the side wall 4 thereof. The groove-spring means 21 also comprises a groove 26 and a spring 27. Likewise, the groove-spring means 22 comprises a groove 28 and a spring 29. To mount the clamping member 11 on the holder 1 the clamping member 11 can be slid onto the holder 1 in a slide-on direction 16 indicated in FIGS. 3 and 4, which direction extends parallel to the orientation of the two mutually parallel groove-spring means 21 and 22.

As is apparent from FIG. 3, the clamping member 11 comprises a latching nose 30 which projects into the holder interior from the frame 15 of the clamping member 11 and which, when the clamping member is slid onto the holder 1, engages behind a holder portion formed by the rear side wall 6 in the present holder 1 to block movements of the clamping member 11 in a direction opposite to the slide-on direction 16. The tongue and groove combinations 21, 22 and 23 and the latching nose 30 only provide a positive coupling between the clamping member 11 of the holder 1 in accordance with the second embodiment and the holder 1, which results in a very reliable connection. The use of a latching nose has the advantage that the clamping member 11 can be removed simply from the holder 1 by disengagement of the latching means, for example in order to replace the clamping member 11.

When a cassette is inserted into the holder 1 in accordance with the second embodiment the clamping member is partly deformed elastically via the dome-shaped free end 14 of the clamping projection 13 at the location of the elastically deformable plate portion 12. As a result of its elastic deformability the elastically deformable plate portion 12 bulges out until a cassette inserted into the holder 1 has reached its final position in the holder, in which position the dome-shaped free end 14 of the clamping projection 13 engages behind a cassette-wall portion of the cassette, so that as a result of the elastic resilient action of the plate portion 12 of the clamping projection can move back in the direction of the holder interior, which cause the bulge of the plate portion 12 to disappear at least substantially.

I claim:

1. A holder of rectangular shape for holding a magnetic tape cassette, said holder having two main walls and three minor walls interconnecting said two main walls, said walls enclosing an interior of said holder, an open fourth side through which the cassette is insertable into the interior of the holder, and a clamping member connected to said holder at one of said minor walls for clamping a cassette inserted in the holder, said clamping member consisting of an elastic material and including a projection projecting into the holder interior, said clamping member being elastically deformed by engagement of a cassette inserted in the holder with said projection, characterized in that:
said clamping member consists of an abrasion-proof elastic plastics and comprises a flat elastically deformable plate portion having a thickness smaller than that of said one of said minor walls to which said clamping member is connected and a frame extending about the periphery of said plate portion and having a thickness greater than the thickness of said plate portion, and said projection projects from said plate portion into the holder interior to engage a minor wall of the cassette and retain the cassette inserted into the holder.

2. A holder as claimed in claim 1, characterized in that said frame includes two mutually parallel frame limbs, and said one minor wall of said holder and each of said two mutually parallel limbs comprise complementary tongues and grooves arranged such that said clamping member is slidable onto the holder in a slide-on direction which extends parallel to the orientation of said two mutually parallel limbs.

3. A holder as claimed in claim 2, characterized in that said clamping member comprises a latching nose which projects into the holder interior from said frame, and said holder includes a holder portion positioned such that when said clamping member is slid onto the holder said latching nose engages behind said holder portion to block a movement of said clamping member in a direction opposite to the slide-on direction.

4. A holder as claimed in claim 1, characterized in that the plastics of which the clamping member is made is a block copolymer which can be processed as a thermoplastic and which comprises a hard segment of polybutylene teraphtalate and a soft segment on the basis of long-chain polyether glycols.

5. A holder as claimed in claim 2, characterized in that the plastics of which the clamping member is made is a block copolymer which can be processed as a thermoplastic and which comprises a hard segment of polybutylene teraphtalate and a soft segment on the basis of long-chain polyether glycols.

6. A holder as claimed in claim 3, characterized in that the plastics of which the clamping member is made is a block copolymer which can be processed as a thermoplastic and which comprises a hard segment of polybutylene teraphtalate and a soft segment on the basis of long-chain polyether glycols.

7. The combination of a magnetic tape cassette and a holder therefore, said combination comprising:
a magnetic tape cassette including a housing having two major rectangular-shaped parallel main walls, side walls interconnecting said main walls, and a magnetic tape within said housing; and
a holder for said cassette, said holder including two main walls, two side walls connecting said main walls, an opening through which the cassette is insertable into said holder, and a clamping member consisting of an elastic plastic in one of said holder walls for retaining said cassette in said holder, said clamping member including a flat elastically deformable plate portion having a thickness smaller than the thickness of said one of said holder walls, a frame portion surrounding said plate portion having a thickness greater than the plate portion and securing the clamping member in the holder wall, and a clamping projection projecting from the plate portion into the holder interior to engage one of said cassette walls when said cassette is received in said holder, said plate portion having two opposing sides fixed in said one holder all and said clamping member having an outer surface flush with the outer surface of said one holder wall, and
said one cassette wall including a wall portion behind which the projection is engageable to hold said cassette in said holder, said projection of said clamping member being dimensioned such that during insertion of said cassette into said holder said projection is deflected by said wall portion and said plate shaped portion elastically deforms and bulges outwards from said outer surface of said one holder wall, and with further insertion of said cassette into said holder said projection moves in the direction of the holder interior by release of the elastic deformation of said plate portion and engages behind said cassette wall portion to retain the cassette therein with said outer surface of said clamping member substantially flush with said outer surface of said one holder wall.

8. The combination according to claim 7, wherein said one holder wall includes an opening extending from an edge thereof and said clamping member and said opening comprises means for slidably receiving said clamping member.

9. The combination according to claim 8, wherein said means for slidably receiving said clamping member comprises complementary tongue and grooves.

10. The combination according to claim 9, wherein said holder and said clamping member comprise retaining means for retaining said clamping member in said opening after said clamping member is slid into said opening.

11. The combination according to claim 9, wherein said retaining means includes a latching nose on said clamping member which engages said holder.

12. The combination according to claim 10, wherein said clamping member includes a frame around the periphery of said plate portion having a thickness equal to the thickness of said one cassette wall.

13. The combination according to claim 7, wherein said clamping member includes a frame around the periphery of said plate portion having a thickness equal to the thickness of said one cassette wall.

14. A holder for holding a magnetic tape cassette having a housing with a pair of main walls and minor, side walls connecting said main walls, said holder comprising:
two main walls, two opposing side walls and an end wall connecting said two main walls, said walls enclosing an interior of said holder, said two main walls and said two side walls defining an aperture opposite said end wall through which the cassette is insertable into the interior of said holder, and
a clamping member arranged in one of said side walls for retaining the cassette in the holder, said clamping member including a flat elastically deformable plate portion having a thickness less than that of said one of said side walls, a frame extending about the periphery of said plate portion and including a latching nose, and a projection projecting into the interior of said holder for engaging behind a wall projection of a side wall of the cassette for retaining the cassette in said holder,
said one holder side wall including an opening for said clamping member extending from said end wall, said opening being bounded by edges of said side wall from which complement and slidingly receive said frame with said clamping member flush with the outer surface of said side wall, and said latching nose being arranged such that with said clamping member received in said opening said latching nose engages behind said end wall to retain said clamping member in said opening, and
wherein during insertion of said cassette into said holder said projection is deflected by the cassette wall portion and said plate shaped portion bulges elastically outwards, and with further insertion of said cassette into said holder said projection moves in the direction of the holder interior by elastic action of said plate portion and engages behind the wall portion of the cassette side wall to retain the cassette therein.

15. A holder according to claim 14, wherein said edges bounding said opening for said clamping member and said frame of said clamping member comprise complementary tongues and grooves.

16. A holder as claimed in claim 15, characterized in that the plastics of which the clamping member is made is a block copolymer which can be processed as a thermoplastic and which comprises a hard segment of polybutylene teraphtalate and a soft segment on the basis of long-chain polyether glycols.

17. A holder as claimed in claim 16, characterized in that the plastics of which the clamping member is made is a block copolymer which can be processed as a thermoplastic and which comprises a hard segment of polybutylene teraphtalate and a soft segment on the basis of long-chain polyether glycols.

* * * * *